United States Patent [19]
Sciulli

[11] 3,988,674
[45] Oct. 26, 1976

[54] FRAME SYNCHRONIZATION IN SPEECH PREDICTIVE ENCODED COMMUNICATION SYSTEM

[75] Inventor: Joseph Albert Sciulli, Rockville, Md.

[73] Assignee: Communications Satellite Corporation (Comsat), Washington, D.C.

[22] Filed: Mar. 17, 1975

[21] Appl. No.: 559,206

[52] U.S. Cl. ............................................ 179/15 BS
[51] Int. Cl.² .......................................... H04J 3/06
[58] Field of Search........ 179/15 AS, 15 BS, 15 BY, 179/15 BW, 15 BV; 178/69.5 R

[56] References Cited
UNITED STATES PATENTS

| | | | |
|---|---|---|---|
| 3,754,102 | 8/1973 | Clark.............................. | 179/15 BS |
| 3,836,722 | 9/1974 | Muller............................. | 179/15 BS |
| 3,927,268 | 12/1975 | Sciulli et al..................... | 179/15 BW |

*Primary Examiner*—David L. Stewart
*Attorney, Agent, or Firm*—Sughrue, Rothwell, Mion, Zinn & Macpeak

[57] ABSTRACT

Bit rate compression in a digital communications system is provided by transmitting voice information from n telephone circuits over the capacity conventionally allocated for transmission of voice information from n/2 circuits without appreciable degradation in quality. Alternatively, a doubling of the number of voice circuits may be provided with transmission at the same bit rate required for conventional digital transmission of voice information. Each frame period, at the transmitter, all n circuits are serviced and, utilizing a predictive encoding scheme, only unpredictable samples in the given frame are transmitted over the available channel capacity. A sample assignment word (SAW), which identifies the circuits corresponding to the unpredictable samples, is transmitted therewith. Upon reception of the transmitted frame comprising the SAW and the unpredictable samples, the receiver updates the stored samples which were transmitted during previous frames as unpredictable samples by substituting the received unpredictable samples for the stored samples in accordance with the channel routing information provided by the transmission capacity conventionally allocated for transmission of digital voice information from the SAW, thereby enabling proper reconstruction of all samples in the given frame. Means are provided for effectively recirculating the servicing sequence of the n circuits to alleviate "overload." Means are also provided to insure proper reception of the SAW by the receiver. A unique frame synchronization technique requiring no increase in transmitted bit rate by transmitting synchronization information in an unused time slot only during periods of underflow is employed.

10 Claims, 13 Drawing Figures

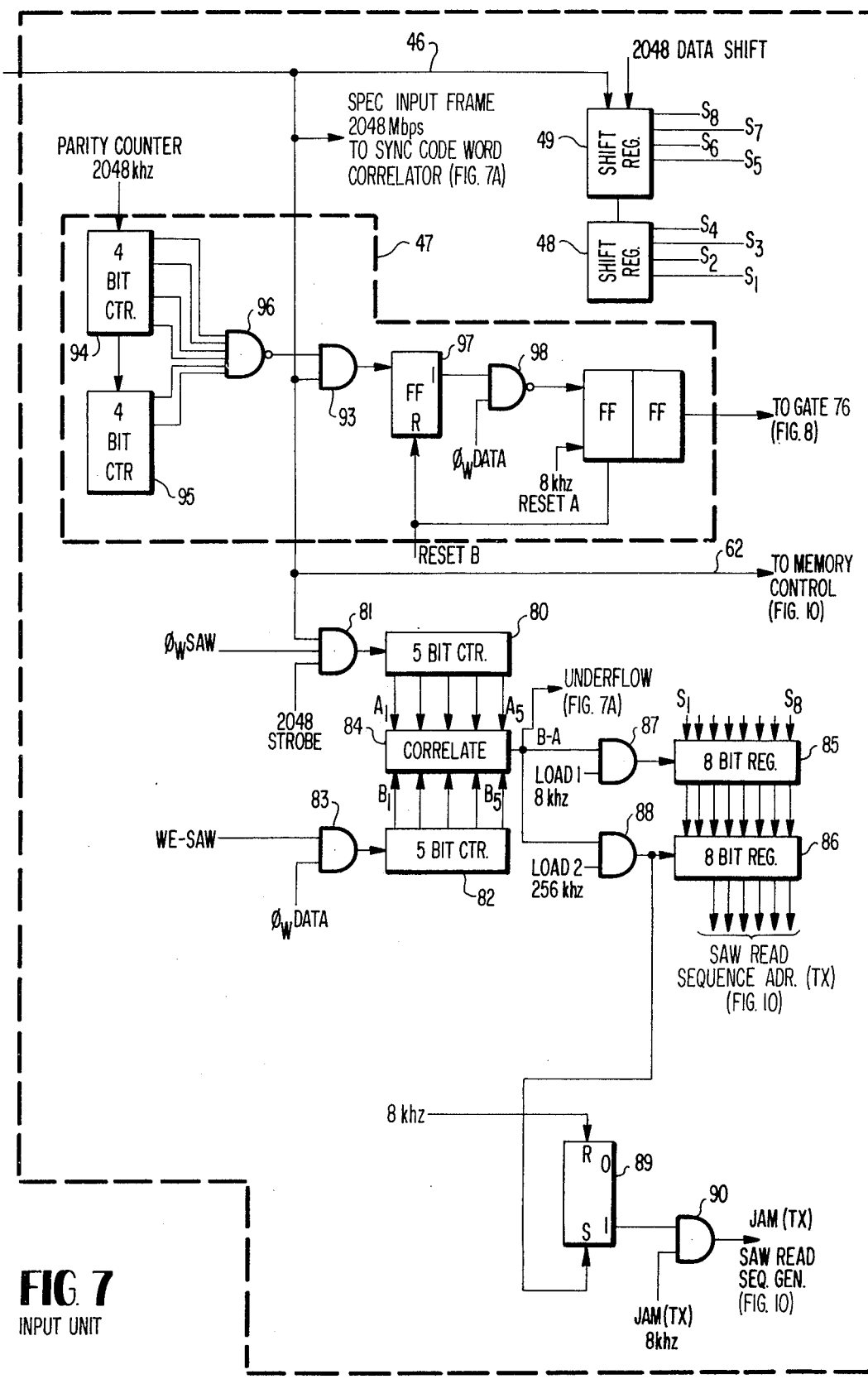
FIG. 7 INPUT UNIT

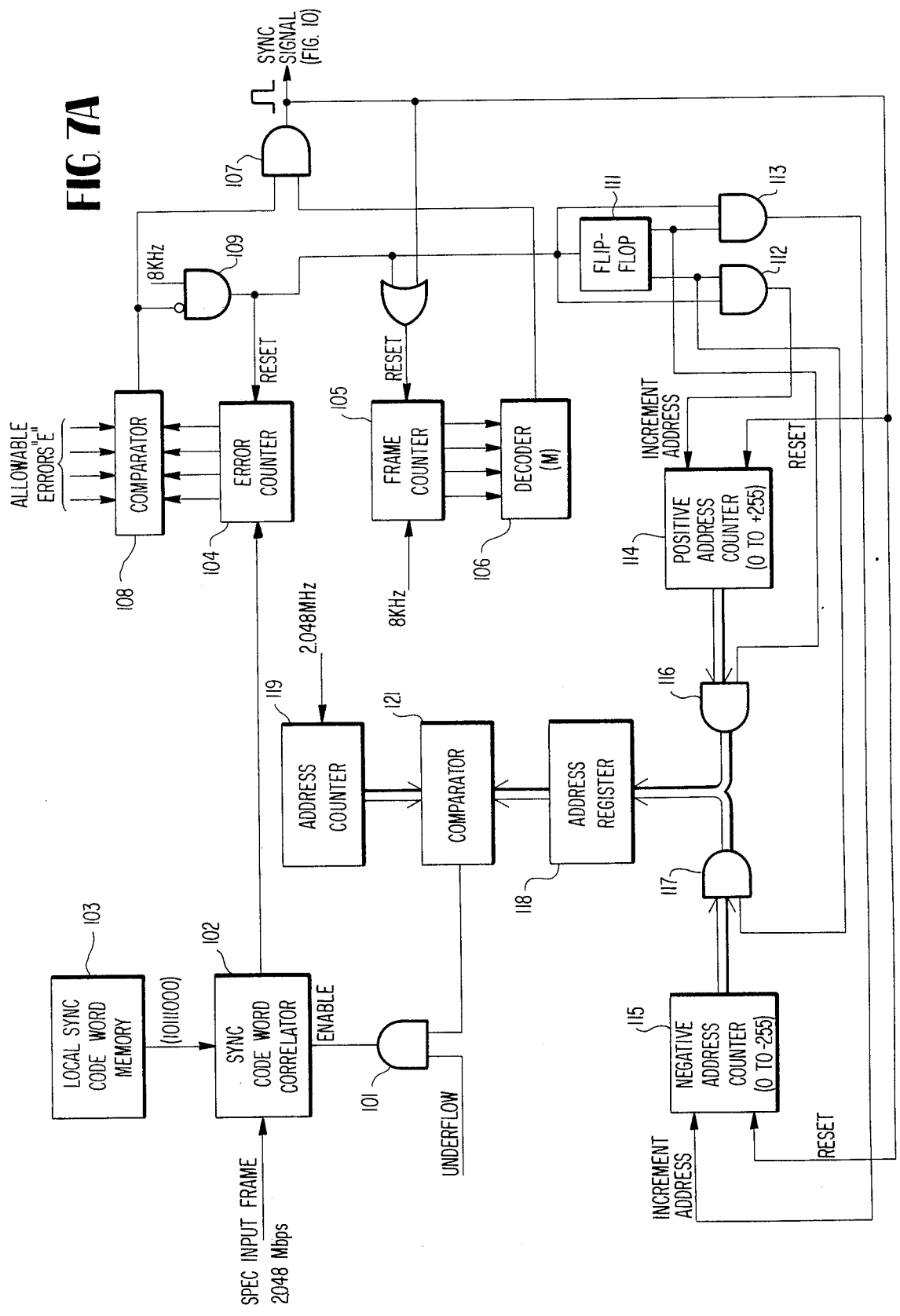

SAW UNIT

SPEC RECEIVER

FRAME SYNCHRONIZATION IN SPEECH PREDICTIVE ENCODED COMMUNICATION SYSTEM

BACKGROUND OF THE INVENTION

1. Field of the Invention

This invention relates to multi-channel communications systems employing a redundancy removal scheme using predictive encoding of speech in a digital, multi-channel communications system for the purpose of bit rate reduction with no appreciable degradation in voice quality, and more particularly, to a frame synchronization technique for use in such communications systems without increasing the transmitted bit rate.

2. Description of the Prior Art

In communications system using long and expensive transmission facilities, such as submarines cables and satellite communications systems, terminal facilities which insure optimum utilization of the transmission channels are very important. A well-known analog system, the Time Assignment Speech Interpolation (TASI) system achieves communications efficiency, i.e. bandwidth compression, by means of a transmission time savings. The TASI system takes advantage of the statistical fact that during a telephone conversation a one-way telecommunications channel is active only on the average of about 50% of the time. The TASI system monitors each voice circuit for voice activity and, in response to the detection of voice, connects a talker to an available channel. In this manner, a number of talkers greater than the number of available channels may be serviced by sharing the channels on a talkspurt interpolated basis.

The quality of speech transmitted by TASI is effected by three main sources of degradation. First, degradation occurs due to interpolation. If the number of talkers simultaneously talking in one direction exceeds the number of available channels a certain number of these talkers will be temporarily denied a channel. This condition is known as "freeze-out". The portion of speech not being transmitted by a talker who is temporarily "frozen-out" results in speech quality degradation. Second, degradation occurs due to the operation time of speech detectors, there being one speech detector for each voice circuit. Prior to connecting a voice circuit to an available channel the voice detector must detect speech activity in the voice circuit. During the time required for the voice detector to actually detect voice, the talker's speech signals are lost causing further degradation of voice quality. Third, degradation is due to speech signals being lost during the time needed for switching and signaling functions to establish the proper connection between talker and listener once speech activity is detected by the voice detector.

There are many characteristics of the Speech Predictive Encoding Communication (SPEC) System as described in U.S. Pat. No. 3,927,268 which represent improvements over prior art TASI systems. These improvements, while mentioned here, will become more readily apparent from the detailed discussion of which follows. First the SPEC system achieves bandwidth reduction by accommodating the traffic of $n$ telephone circuits in the capacity of $n/2$ telephone channels with no noticeable degradation in received voice quality. Secondly, the SPEC system, being an all digital system, makes decisions on each voice circuit at the basic sampling rate. For this reason, the transmission of data within the voice band, which is a difficult task for TASI-like systems, is easily accommodated. Third, the SPEC system employs a predictive encoding scheme which significantly reduces, by about 15%, the average activity factor (defined as the number of voice samples transmitted/the total number of voice samples) over prior art systems without any appreciable loss in voice quality. Fourth, whereas the effect of "freeze-out" in TASI-like systems manifests itself as a "chopping" or "clipping" of the voice signal which can result in the loss of an entire syllable, the effect of "overload" (i.e. freeze-out) in the SPEC system results only in an amplitude error (as opposed to a "clip") in the recieved voice signal. In an "overload" condition the SPEC system does not really "freeze-out" samples from the voice circuits "frozen-out" since those circuits will have corresponding voice samples stored at the receiver whereby the receiver can reconstruct replicas of the "frozen-out" samples. Also, by means of a recirculation of the servicing sequence of $n$ voice circuits the subjective effect of "overload" is substantially reduced. Fifth, the SPEC system utilizes a parity check scheme for protecting the transmitted voice samples thereby reducing the effect of errors (resulting in small amplitude error) caused by channel noise. Sixth, the SPEC system is built in a modular configuration (i.e., 64 circuits serviced by 32 circuits) to permit easy expansion to large capacities. Seventh, the flexibility of the SPEC system allows transmission in either time division multiplex-frequency division multiple access (TDM-FDMA) or time division multiplex-time division multiple access (TDM-TDMA) systems. Eighth, the SPEC system can be used in a point to multipoint fashion in satellite communications. Any station can transmit voice information to several other stations while each of the other stations would use a reciever which only uses the specific voice circuits addressed to it. In this manner, larger amounts of telephone traffic destined for multiple stations can be interpolated at the transmitter of a single station. Finally, implementation of the SPEC system results in a lower cost per circuit as well as higher quality service than prior art systems such as TASI.

In the SPEC system, bit rate compression in a digital, multichannel, voice communications system is accomplished while maintaining normal voice transmission quality. The system is designed to transmit all information from $n$ telephone circuits over the transmission capacity conventionally allocated for digital transmission of all voice information from $n/2$ circuits. All $n$ voice circuits are sampled at a rate, known as the frame rate, of one voice circuit every $125\mu$ secs. Each voice sample in a frame period is compared at the transmitter with the corresponding voice sample of a previous frame stored in a predictive frame memory (PFM). If the comparison indicates that the present sample is predictable from the corresponding previous sample, a logic "O" is generated indicating that the present sample need not be transmitted. If the comparison indicates that the present sample is unpredictable from the corresponding previous sample, then a logic "1" is generated indicating that the unpredictable sample should be transmitted.

Transmission of the unpredictable samples is accomplished in the following manner. A frame of information equivalent in bit rate to that required for conventional digital transmission of all voice information from $n/2$ voice circuits comprises the essential information and is formed at the transmitter. Assuming $n = 64$ the transmission frame comprises 24, 8 bit time slots $T_1$ thru $T_{24}$ designated for transmission of unpredictable samples and eight, 8 bit time slots $T_{25}$ thru $T_{32}$ occupied by a 64 bit sample assignment word (SAW). The SAW informs the receiver as to which of the 64 voice circuits the unpredictable samples $T_1 - T_{24}$ belong.

As the comparisons are made at the transmitter, the first comparison indicating an unpredictable sample results in that sample being placed in time slot $T_1$. If that sample is from voice circuit 3, for example, then the SAW will have "O" in its first and second bit slots and a "1" in the third bit slot. If the next voice circuit indicative of unpredictability is, for example, voice circuit 6, then that unpredictable sample will be placed in time slot $T_2$, and the SAW will have "O" bits in bit slots 4 and 5 and a "1" in bit slot 6. This operation continues until 64 comparisons have been made and the unpredictable samples placed in the available time slots $T_1 - T_{24}$.

The receiver already has stored therein 64 voice samples which were transmitted during previous frames as unpredictable samples. When the reciever receives the presently transmitted information including the sample assignment word, it then updates the corresponding 64 voice samples stored therein by substituting the unpredictable voice samples for the stored voice samples in accordance with the channel routing information provided by the SAW. The receiver is then in a position to properly reconstruct the present frame of all 64 voice samples.

The SPEC system is designed around the statistics of speech such that on the average in a system of 64 voice circuits of information, only 24 voice circuits will be non-redundant. However, there will be times when there is non-redundancy, i.e., unpredictability, in more than 24 voice circuits thereby resulting in an "overload" condition for those circuits which number above the 24 time slots available for transmission on that particular frame. The system alleviates "overload" in two ways. First, if an unpredictable sample is not transmitted because time slots $T_1$ thru $T_{24}$ are filled, the receiver utilizes the corresponding previous sample stored at the receiver for reconstruction of the unpredictable sample which could not be transmitted. Though the corresponding previous sample is being reconstructed as the unpredictable sample, the fact is the corresponding previous sample stored at the receiver should be close in value to the unpredictable sample which could not be transmitted. Secondly, the subjective effects of "overload" are alleviated by effectively recirculating the servicing sequence. For example, during frame 1 the voice circuits are serviced at the transmitter in sequence from 1 to 64. During the next frame, the voice circuits are effectively serviced in sequence starting with voice circuit 2; voice circuit 1 being the 64th circuit to be serviced; and so on. This recirculation of the servicing sequence continues so that in a period of 64 frames each circuit has had the opportunity to be serviced at each priority level (i.e. first to 64th). In this manner, if the system is operating under "overload" conditions the higher numbered circuits are not always serviced last since effectively those circuits become the lower numbered circuits on successive frames.

In order for the SPEC decoder to correctly reconstruct the PCM voice signals, the position of the first bit of each frame must be known. This is the classic problem of frame synchronization which is normally solved by adding synchronization information to each frame, which upon recognition at the receiver, automatically synchronizes the frame. This approach necessarily increases the transmission bit rate without increasing the information bit rate. In many cases, the synchronization scheme is required to achieve short acquisition time and low miss and false detection probabilities. As these requirements are made more stringent, the amount of synchronization information transmitted per frame must increase.

SUMMARY OF THE INVENTION

It is therefore an object of the present invention to provide a unique method of frame synchronization which permits the realization of the maximum bit rate compression in the SPEC system.

It is another object of the invention to provide a frame synchronization technique for the SPEC system which requires no increase in transmitted bit rate to support the frame synchronization operation.

According to the present invention, the foregoing and other objects are attained by utilizing the bit rate available in the SPEC output frame during periods of underflow. In the preferred embodiment of the SPEC system as described in the aforementioned Joseph A. Sciulli et al. application Ser. No. 336,589, the SPEC frame is composed of 64 bits of the sample assignment word (SAW) and 24 eight-bit time slots reserved for the transmission of unpredictable samples. As previously explained, if the number of trunks requiring transmission of a sample during a single frame interval exceeds 24, the system is said to be in a condition of overflow. Conversely, if less than 24 trunks require transmission of a sample, the system is in an underflow condition. The synchronization system according to the invention operates by transmitting a synchronization code word in the 24th time slot of the frame only during periods of underflow. It can be shown that the probability of transmitting a synchronization word, i.e. the probability of 23 or fewer occupied time slots, is given by:

$$P(\phi \leq 23) = \sum_{i=0}^{23} \binom{\lambda}{i} \alpha(1-\alpha)$$

where $\alpha$ is the ensemble speech activity and $\lambda$ ($0 \leq \lambda \leq 64$) is the input trunk loading. For the design value of $\alpha = 0.32$ and the worst case condition of $\lambda = 64$, $P(\phi \leq 23) = 0.80$. This implies that a synchronization word will be transmitted during at least eight of every ten frames on the average.

BRIEF DESCRIPTION OF THE DRAWINGS

The specific nature of the invention, as well as other objects, aspects, uses and advantages thereof, will clearly appear from the following description and from the accompanying drawings, in which:

FIG. 7 is a schematic diagram of part of an input unit at the receiver which receives the frame of information transmitted and provides SAW sequence synchronization.

FIG. 7A is a schematic diagram of another part of an input unit at the receiver which receives the frame of information transmitted and provides frame synchronization.

DESCRIPTION OF THE PREFERRED EMBODIMENT

Figure 1:
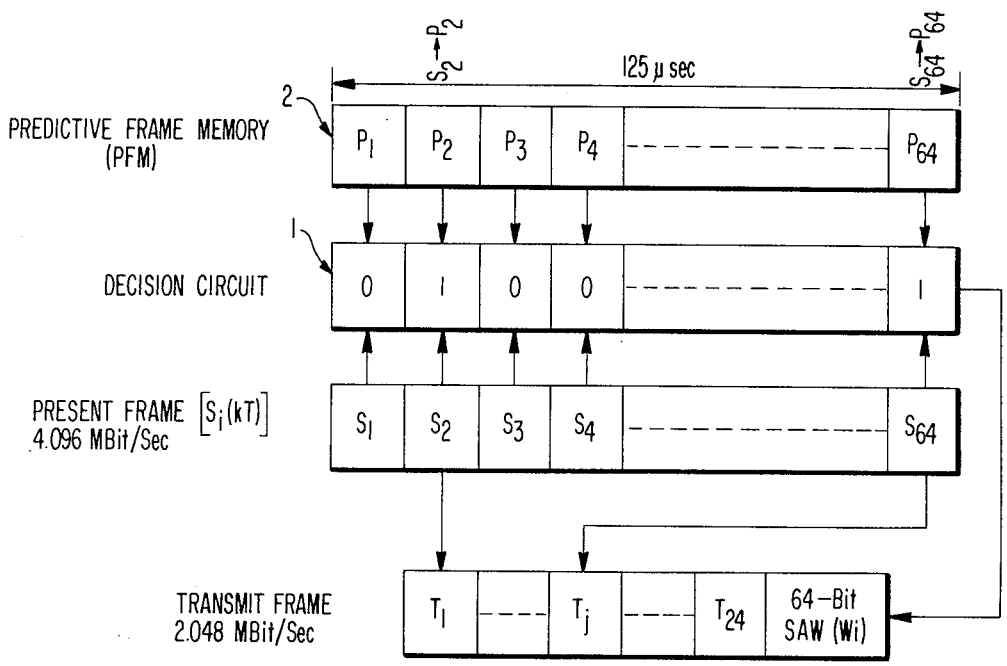
FIG. 1 is a diagram showing functionally the manner in which bit rate compression is achieved in a digital, multi-channel communications system using a redundancy removal scheme.

Referring to FIG. 1, there is shown functionally the manner in which bit rate compression is achieved in a digital, multichannel communications system using redundancy removal techniques. During one frame, $n$ voice circuits are sampled and each sample $S_i(kT)$, a present sample, is fed to a decision circuit 1 shared by all the voice circuits. In decision circuit 1, the present sample $S_i(kT)$ is compared with $\hat{S}_i(kT)$. $\hat{S}_i(kT)$ is set equal to $P_i$ which is the corresponding previous sample stored in predictive frame memory (PFM) 2. Upon comparison, if the difference between the present sample $S_i(kT)$ and the predictive value $\hat{S}_i(kT)$ is greater than a predetermined threshold $\tau$, it is an indication that the present sample $S_i(kT)$ cannot be adequately predicted from the corresponding value $\hat{S}_i(kT)$. Therefore, the present sample $S_i(kT)$ must be transmitted. The decision circuit 1 transfers the unpredictable, present sample $S_i(kT)$ to the ith location in the predictive frame memory 2 wherein $S_i(kT)$ replaces $P_i$. If the difference between $\hat{S}_i(kT)$ and $S_i(kT)$ is less than or equal to the predetermined threshold $\tau$, then $S_i(kT)$ need not be transmitted and the value $\hat{S}_i(kT) = P_i$ remains in PFM 2. The decision circuit 1 also generates a logic "1" for every unpredictable sample $S_i(kT)$ and a logic "O" for every predictable sample $S_i(kT)$. The series of "1"s and "0"s comprises the sample assignment word (SAW) which is part of the frame of information to be transmitted. Each time a "1" is generated the associated unpredictable, present sample $S_i(kT)$ is placed in an available time slot $T_j$ of the transmission frame. The prediction rules are summarized as shown in FIG. 1.

After all n voice circuits are processed, a frame of information comprising the unpredictable present samples and the SAW which identifies the voice circuits associated with the unpredictable, present samples is transmitted. At the receiver, as will be further described, the transmitted information is used to update a predictive frame memory (PFM) which provides a sample every 125 μsec. to reconstruct speech in each of the n voice circuits.

In the preferred embodiment of the present invention, it is possible to transmit n voice circuits over $n/2$ channels. Assuming $n = 64$ wherein speech on each voice circuit is quantized into 8 bits, the normal bit rate would be equal to 64 x 8 x 8 x 8 khz (the Nyquist sampling rate) = 4096 $k$ bits/sec. The SPEC system, however, utilizes only 24 time slots $T_1 - T_{24}$ (8 bits each) of voice information plus eight time slots $T_{25} - T_{32}$ (8 bits each) for the SAW. The bit rate is then ½ of the normal rate or (24 = 8 time slots) x (8 bits/time slot) x 8 khz = 2048 $k$bits/sec. The 2:1 compression ratio is achieved by applying to each of the n channels the predictive encoding algorithm called a zero-order predictor, well known in the art, and described above.

Although the efficiency of this system relies upon the redundant qualities of speech, all of the trunks serviced by the system need not be voice circuits. The SPEC system would be operative to provide an efficient use of transmission capacity where a small percentage of the input trunks contained digital data. The transmission of digital data would be based on standard techniques known to those skilled in the art.

Figure 6:
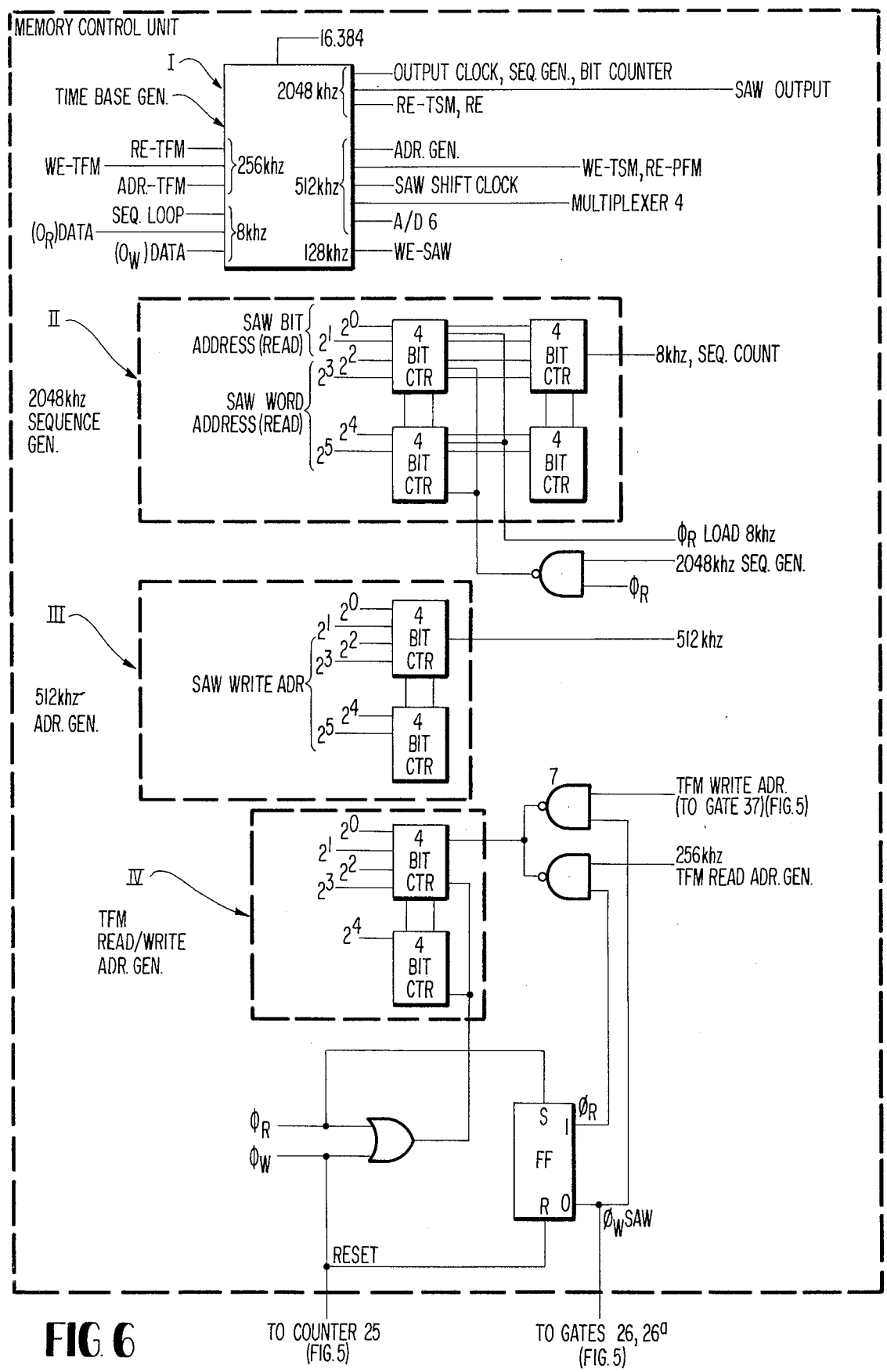
FIG. 6 is a schematic diagram of a memory control unit of the transmitter which provides the necessary timing and addressing functions for the transmitter.
Figure 10:
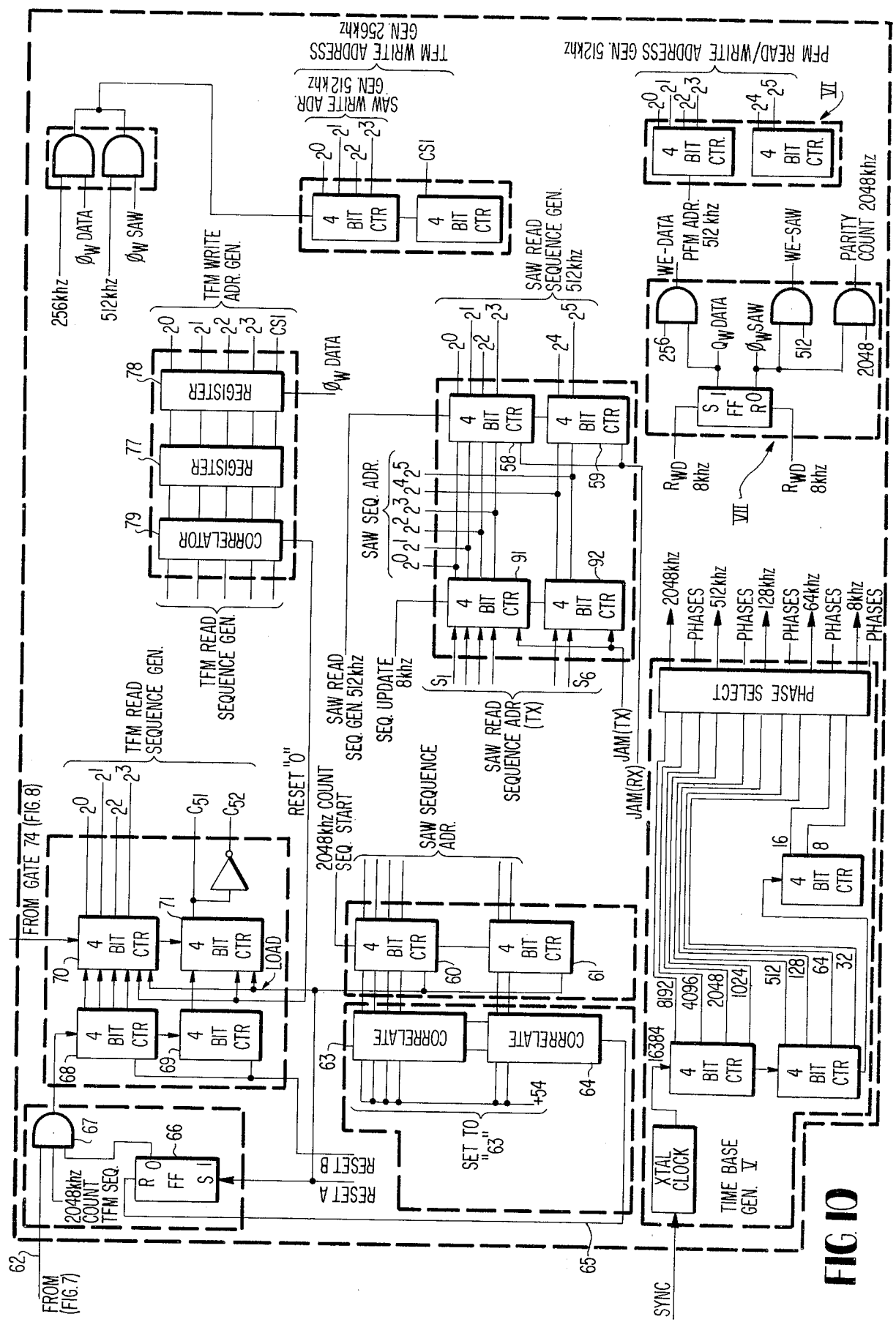
FIG. 10 is a schematic diagram of the memory control unit of the receiver which provides the necessary timing and addressing functions for all units of the receiver.

In continuing with a discussion of the present invention, references will be made to FIGS. 6 and 10 of the drawings while discussing in detail other Figures of the drawings. FIG. 6 shows the memory control unit for the transmitter which provides the basic timing and addressing information. For example, there is shown in FIG. 6 a time base generator I which generates the necessary timing functions of the transmitter units. The abbreviations shown in the time base generator I and other units of the memory control unit will become apparent from the further discussion of the invention. For example, WE-TFM refers to write enable - transmit frame memory; RE-PFM refers to read enable - predictive frame memory. Also shown are groups II, III, and IV of 4-bit counters which provide necessary addressing information for the transmitter units. For example, IV provides addressing information for the TFM (transmit frame memory) of the transmitter while II is the sequence generator. The individual units at the transmitter serviced by the several units of the transmitter serviced by the several units of the memory control unit are appropriately referenced as to addressing information received and clocking periods of the addresses. The detail shown in FIG. 6 is given to enable one of ordinary skill in the art to more readily understand the timing and addressing functions required for the present invention, although it is to be understood that even without such detail one of ordinary skill would comprehend such timing and addressing functions upon reading the description of the preferred embodiment. The above is also true with respect to the memory control unit (FIG. 10) of the receiver. For example, the memory control unit has a time base generator V synchronized with time base generator I of FIG. 6 and a predictive frame memory (PFM) address generator VI which addresses the predictive frame memory of the receiver.

Figure 2:
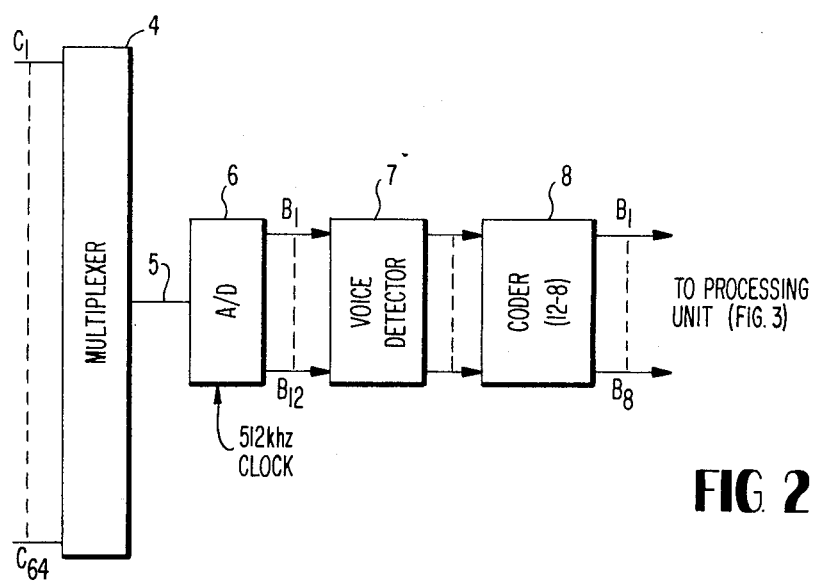
FIG. 2 is a block diagram of part of the equipment used at the transmitter.

Referring to FIG. 2, there is shown a block diagram of part of the apparatus of the present invention used at the transmitter. A multiplexer 4, known in the art, receives analog voice information on 64 parallel voice circuits $C_1 - C_{64}$ and multiplexes the information in a time series for transmission over line 5 to analog/digital converter 6. Analog/digital converter 6, which is a linear encoder, encodes the analog signal from each voice circuit $C_1 - C_{64}$ into a digital code word $S_i(kT)$ (present sample) comprising 12 parallel bits $B_1 - B_{12}$ at the clock rate of 64 × 8 khz = 512 hz. Each 12 bit, digital code word $S_i(kT)$ is then fed to a digital voice detector 7 (shared by all circuits $C_1 - C_{64}$) which is used to minimize the unnecessary transmission of noise. Digital voice detector 7 may be of a type described in U.S. Pat. No. 3,712,959, entitled "Method and Apparatus For Detecting Speech In The Presence Of Noise," issued to Ettore Fariello and assigned to the assignee of the present invention. Actually, since the signals from the voice circuits are time division multiplexed the voice detector of the referenced patent would be adapted for use in the SPEC system to have common voice detection circuitry for circuits $C_1 - C_{64}$; however, there would be individual hangover time storage for each such voice circuit. Each digital code word is then fed to a 12/8 Digitally Linearizable Coder 8, known in the art, which compresses the 12 bit digital code word $S_i(kT)$ to an 8 bit $B_1 - B_8$ digital code word $S_i(kT)$. The conversion of the analog signal into a 12 bit digital code word by a linear encoder 6 companded to an 8 bit digital code word by coder 8 is required, as is well known, to obtain a desired companding characteristic.

Figure 3:
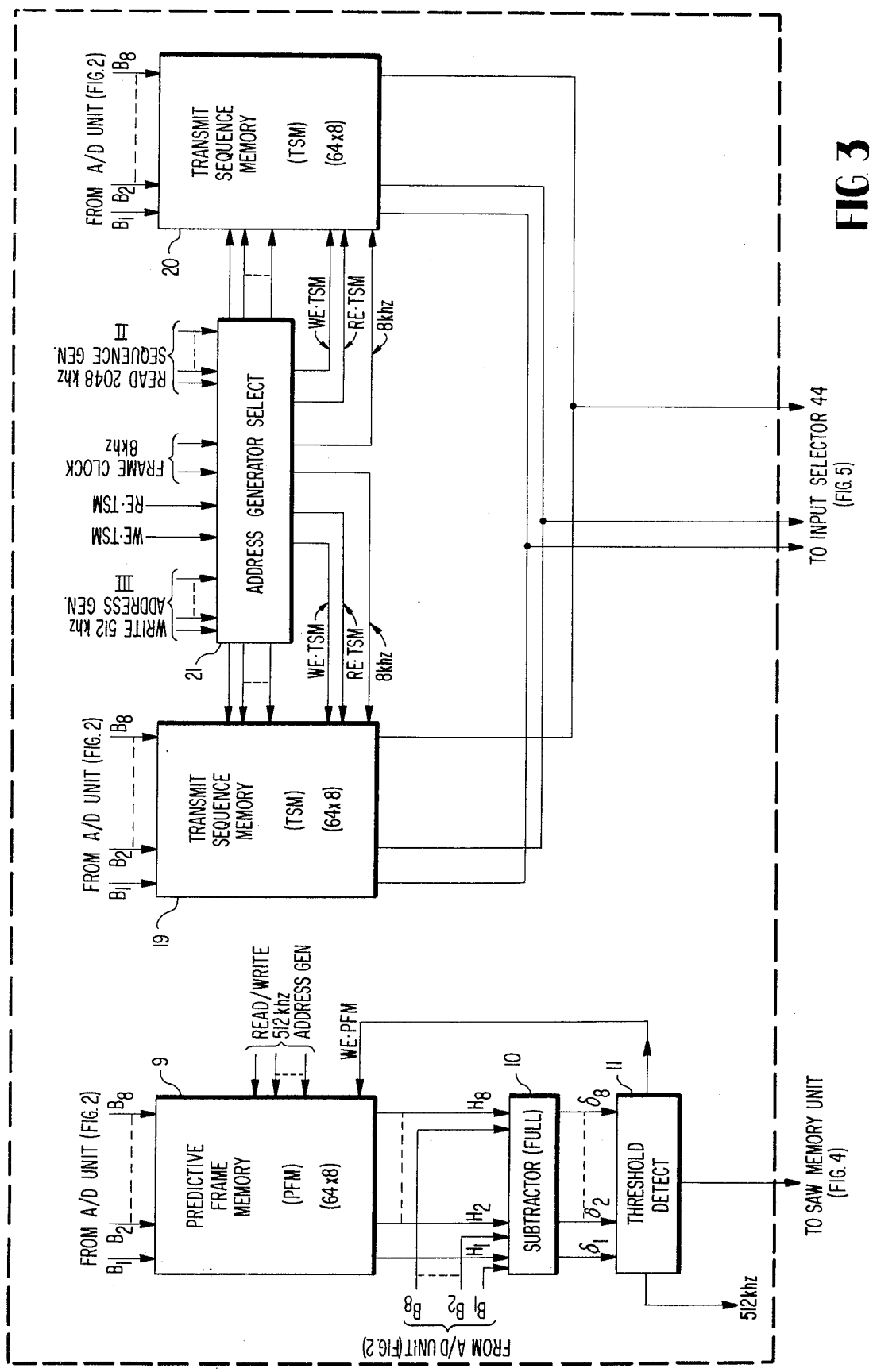
FIG. 3 is a schematic diagram of a processing unit for processing the digital signals at the transmitter.

Referring to FIG. 3, the 8-bit $B_1 - B_8$ digital code word $S_i(kT)$ for each voice circuit $C_1 - C_{64}$ is then fed as an input to predictive frame memory (PFM) 9 and to a full subtractor 10. Predictive frame memory 9 is a storage register having a capacity of 64 rows (one for each voice circuit $C_1 - C_{64}$) with 8 bits/row. Full subtractor 10 digitally subtracts, in a manner well-known in the art, the digital code word of the present sample $S_i(kT)$ of the ith voice circuit from the digital code word representing the corresponding prediction $\hat{S}_i(kT)$ = $P_i$ (the corresponding previous sample) comprising 8 bits $H_1 - H_8$ stored in PFM 9. The corresponding prediction $\hat{S}_i(kT)$ is read out of PFM 9 by a 512 khz Read/-Write address generator (shown in FIG. 6) synchronized with the time at which the corresponding present sample $S_i(kT)$ is fed to the full subtractor 10. The 512 khz Read/Write address generator generates a 6-bit digital code word which defines any one of the 64 rows in PFM 9. The output of full subtractor 10 is a digital code word $\delta$ comprising 8 bits $\delta_1 - \delta_8$ which represents the difference in magnitude between the present sample $S_i(kT)$ and the corresponding prediction value $\hat{S}_i(kT)$. The digital code word $\delta$ (i.e. "difference" code word) is then fed to threshold detector 11. If the difference code word $\delta$ is greater than a stored threshold $\tau$, threshold detector 11 generates a write enable (WE-PFM) pulse (a logic "1") which is fed to PFM 9 and to serial/parallel converter 12 of the sample assignment word (SAW) memory of FIG. 4. The logic "1" enables PFM memory 9 to substitute the present sample $S_i(kT)$ for $P_i$ (contents of PFM 9) in the correct row defined by the 6-bit code word of 512 khz Read/ Write address generator. If the difference code word $\delta$ is less than or equal to the threshold $\tau$, threshold detector 11 generates a logic "0" which is fed to serial/parallel converter 12 of the SAW memory of FIG. 4. However, the present sample $S_i(kT)$, being predictable under the predictive encoding algorithm, is not substituted in PFM 9 for $P_i$.

Figure 4:
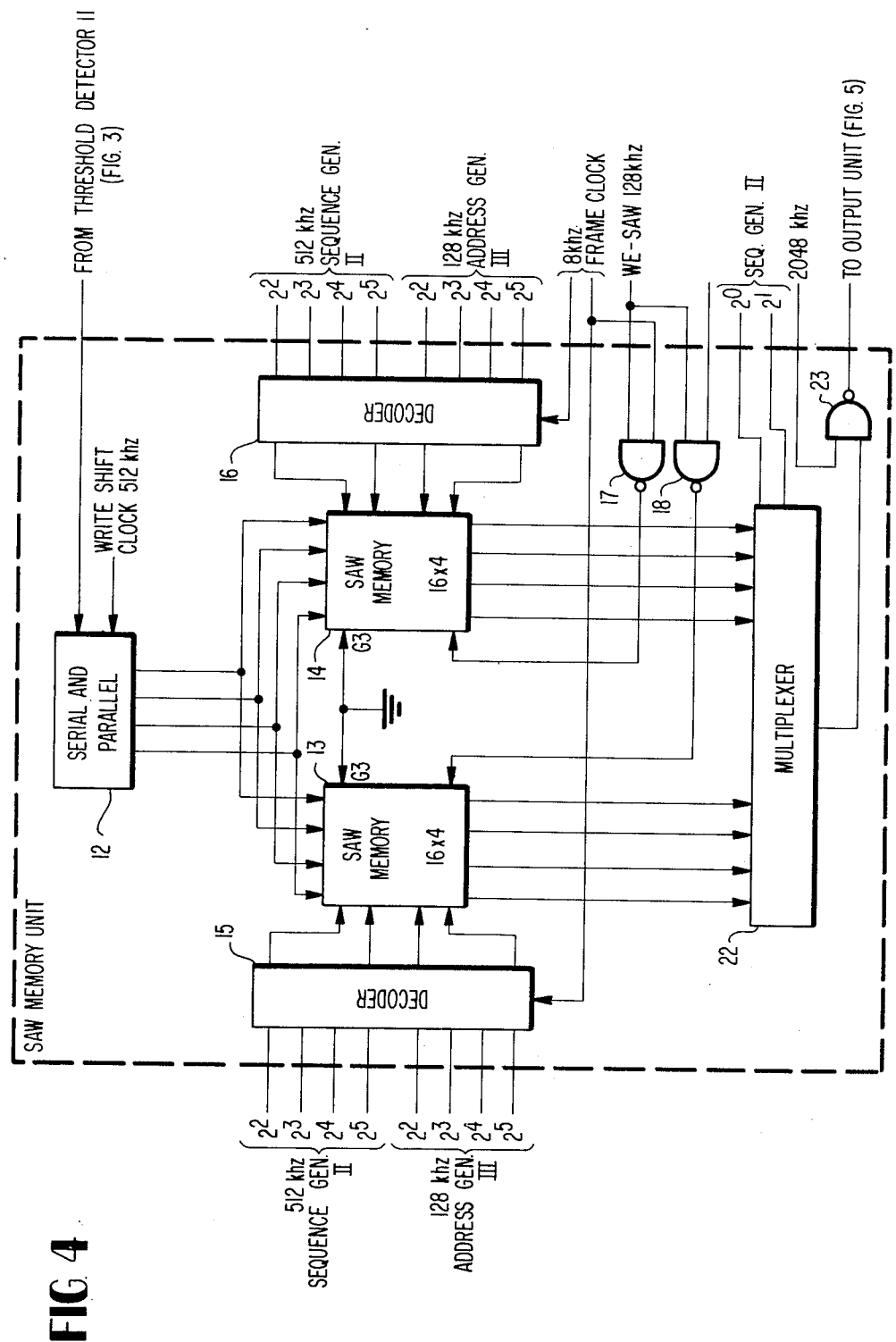
FIG. 4 is a schematic diagram of the sample assignment word (SAW) memory unit of the transmitter.

Referring to FIG. 4, as the 64 comparisons are made, one for each voice circuit sampled, the 64 logic "1's" and "0"s which comprise the SAW are converted, 4 bits at a time, from serial to parallel form by converter 12 and fed in parallel into one of two SAW memory units 13 or 14. SAW memory units 13 and 14 are storage memories having a capacity of 16 rows × 4 bits/row or 64 bits.

The SAW memory units 13 or 14 are enabled on alternate frame periods via respective decoders 15 and 16, by a 8 khz frame clock (see FIG. 6) and via gates 17 and 18, which are enabled every 128 khz by a write enable (WE-SAW) pulse, to write in the SAW associated with the present predictable and unpredictable voice samples for that frame. Decoders 15 and 16 decode a 4-bit word from the SAW word write address III (FIG. 6) which defines one of 16 rows for the SAW memories 13 and 14 whereby each group of 4 bits of the SAW is placed in a respective SAW memory. While one SAW memory, for example memory 13, is writing in the SAW of the present frame, the other is reading out the SAW of the previous frame.

While the present samples $S_i(kT)$ from voice circuits $C_1-C_{64}$ are being compared in full subtractor 10 with the contents $P_1 - P_{64}$ of the PFM 9, the present samples $S_1(kT) - S_{64}(kT)$ are being written into one of the two transmit sequence memories (TSM) 19 or 20 of FIG. 3. Each TSM 19 or 20 is a storage memory having a capacity of 64 rows by 8 bits/row and is enabled to write-in the present samples during alternate frame periods (while the other memory is reading-out samples from the previous frame) via an address generator select 21 by the 8 khz frame clock. Address generator select 21 is merely a set of switches which transfer the time and address signals to the proper TSM 19 or 20, as would be well-known. There is, therefore, stored in TSM 19 or 20, all present samples $S_i(kT)$ from voice circuits $C_1 - C_{64}$.

The manner in which the information to be transmitted, comprising 24 time slots for voice information and 8 time slots for the SAW, is readied for transmission will now be described. In this discussion, it is assumed the 64 present samples $S_i(kT)$ have been compared and stored (actually, while the present samples are being compared and stored, it is the unpredictable samples of the previous frame which are being readied for transmission. Assuming the SAW associated with the 64 present samples has been written into SAW memory 13 (while this was happening SAW memory 14 was reading out the SAW corresponding to the previous frame), it is now ready to output its contents. The row containing the first bit of the SAW to be read from the SAW memory 13 is defined by decoder 15. Decoder 15 receives from the sequence generator II (see FIG. 6), a 4-bit code word (the 4 most significant bits) defining one of the 16 rows in SAW memory 13 while multiplexer 22 receives a 2-bit code word (the 2 least significant bits) from the sequence generator which define where in the row the first bit to be outputted is located. For example, assuming during the third frame, the sequence, by which the SAW is read from SAW memory 13 starts with the bit corresponding to voice circuit $C_3$ and thereafter sequences in order through the other 63 bits (i.e., $C_4, C_5, C_6, \ldots C_{64}, C_1, C_2$). Decoder 15 would initially decode the 4-bit word corresponding to the row in SAW memory 13 in which is stored the bit associated with voice circuit $C_3$ and upon transfer of the row to multiplexer 22, the 2-bit word would define the position in the row where the bit associated with voice circuit $C_3$ is located.

Figure 5:
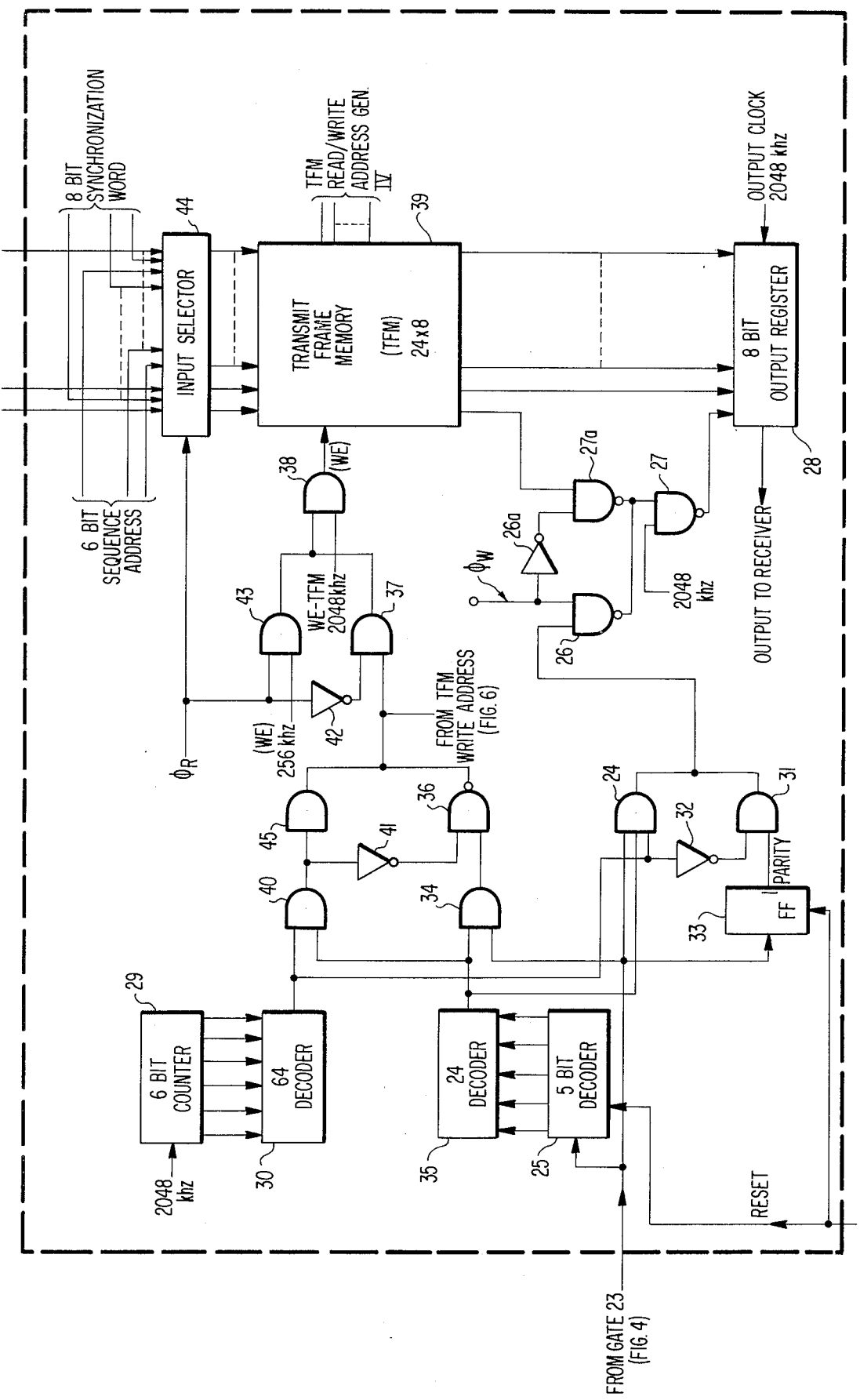
FIG. 5 is a schematic diagram of an output unit which develops the frame of information to be transmitted.

The SAW is clocked at a rate of 2048 khz via "AND" gate 23 to "AND" gate 24 and 5-bit counter 25 which comprise a part of the output unit of FIG. 5. Gate 24 is enabled to pass the first 63 bits of the SAW via gates 26 and 27 to output register 28. A 6-bit counter 29 synchronized with the first bit of the SAW commences counting at the SAW bit rate (2048 khz) and when a count of 63 is reached a decoder 30 decodes the count 63. In response to the decoding of the count of 63, the decoder 30 switches from logic "1" to logic "0" thereby inhibiting gate 24 and enabling gate 31 via inverter 32.

The function of gate 31 is to pass a parity bit as the 64th bit of the SAW, rather than passing the 64th bit of the SAW. A parity bit is generated from the first 63 bits of the SAW and used by the receiver to check for the occurrence of an odd number of errors in the SAW being received. The reason for a parity bit will be further discussed in relation to the receiver of the present invention. If it is predetermined that the SAW should always contain an even number of "1 's", then the receiver will expect to receive a SAW having an even number of "1 's". The parity bit (i.e., 64th bit of the SAW) would then be a logic "1" if the first 63 bits contain an odd number of "1" bits. This is accomplished by feeding the SAW from gate 23 to flip-flop 33 which canges state each time a logic "1" passes through. If at the 64th bit flip-flop 33 is at "1", then a decision is made that the parity bit is set equal to logic "1". If flip-flop 33 is at logic "0", then the parity bit is set ot logic "0". The parity bit is passed through gates 26 and 27 via gate 31 to output register 28.

The SAW is also fed to "AND" gate 34 which is inhibited when decoder 35 has decoded a count of 24 from counter 25. Counter 25 receives the SAW and counts the number of "1 's" in it. Upon reaching a count of 24, counter 25 feeds a 5 number defining that count to decoder 35 for decoding. Until a count of 24 is reached, the SAW is fed via gate 34 to gates 36, 37 and 38. Gate 38, if enabled, will pass a write enable (WE) pulse to transmit frame memory (TFM) 39 for each of the first 24 "'[s"in the SAW.

Gates 34, 36, 37 and 38 will be enabled as follows. If the SAW contains a "1"and counter 25 has not reached a count of 24, then gate 34 will be enabled to pass the "1"bit. Then, if the counter 29 hasn't reached a count of 63 (indicating that this particular bit is part of the SAW associated with the information being prepared for transmission) gate 45 is fed to gate 36 enabling the "1"bit to pass. The "1"bit is then passed through gate 37 which receives its enabling level from inverter 42 when transmit frame memory (TFM) 39 is not in its read-out condition. The "1"bit is then fed to gate 38 which is enabled from gate 43 when the latter is receiving a write enable (WE) pulse which enables TFM 39 to write-in samples from TSM 19.

As the 64 bits of the SAW are fed to the output unit of FIG. 5, the TSM 29 receives the 6-bit code word from the sequence generator II (see FIG. 6) via address generator select 21. The 6-bit code word from the sequence generator II defines the row in which the voice sample corresponding to the first bit read-out of multiplexer 22 is situated. In the present example, the sequence generator II initially generates the 6-bit code word defining row 3 which corresponds to voice circuit $C_3$ hereafter followed in sequence by code words defining voice circuits $C_4$, $C_5$, . . . $C_{64}$, $C_1$, $C_2$. As the sequence generator enables, in sequence, each row, if a write enable (WE) pulse from gate 38 corresponding to a particular bit of the SAW representing the associated voice circuit enables TFM 39, then the sample in that row is transferred via input selector 44 to TFM 39. (Input selector 44 is a set of logic gates enabled to pass either the samples from TSM 19 or a code word defining the particular servicing sequence under consideration and/or an 8-bit synchronization word, as will be further described). For example, if the first five bits (from left to right) of the SAW from multiplexer 22 are 00101 then that indicates (remembering the first bit corresponds to voice circuit $C_3$) that voice circuits $C_3$ and $C_4$ are predictable. When the first "1" bit causes a write enable (WE) pulse from gate 38 the sequence generator II will be enabling row 5 in the TSM 19 thereby resulting in the transfer of the sample in row 5 from TSM 19 to TFM 39. TFM 39 receives a 5-bit code word from TFM Read/Write Address Generator (FIG. 6) defining a row commencing with row 1, in which to store the transferred samples and thereafter output them. This first unpredictable sample will then eventually be transmitted in time slot $T_1$ of the transmission frame. In a like manner when the second "1" bit of the SAW enables the TFM 39, the sample in row 7 of the TSM 19 will be transferred to TFM 39 and eventually will appear in time slot $T_2$ of the transmission frame. In a like manner, all unpredictable present samples are transferred to TFM 39. After all unpredictable samples are loaded in TFM 39 and the SAW is fed to output register 28, the rows in TFM 39 are sequentially enabled by the TFM Read/Write address generator to output the samples on a row-by-row basis from the TFM 39 to output register 28 upon the enabling gate 27a via inverter 26a. The output of output register 28 will then be, in series, 64 bits of the SAW followed by 24 time slots $T_1 - T_{24}$ comprising the unpredictable samples which are then transmitted to a receiver.

Continuing with discussion of the output unit of FIG. 5, assume that in a particular frame there are less than 24 voice circuits which are unpredictable. This means that not all of the transmission time slots $T_1 - T_{24}$ will be filled. Advantage is taken of the available time slots to transmit therein the 6-bit sequence code word which defines the particular servicing sequence corresponding to the frame number and/or the 8-bit synchronization word. In the present example, the 6-bit code word (plus two dummy bits to fill the 8-bit time slot) defining the sequence starting with voice circuit $C_3$ would be transmitted. The purpose of this, as will be hereinafter more fully explained, is to verify to the receiver the servicing sequence associated with the transmitted frame of information in case its sequence generator becomes unsynchronized with the sequence generator of the transmitter. Also in place of the two dummy bit mentioned above, two parity check bits could be used to make a check at the receiver to determine if the sequence code word is being properly received. The parity check bit would be added as discussed previously with respect to the SAW parity check. The 8-bit synchronization word is a unique binary word chosen for its digital correlation properties. In the preferred embodiment, the code word is 10111000 and is permanently stored in a read-only memory of known type.

The manner in which the 6-bit sequence code word and the 8-bit synchronization code word are added to the transmission frame is as follows. The condition under which the decision to transmit either or both the sequence code word and the synchronization code word is that counter 25 has not reached a count of 24 (indicating there are less than 24 logic "1 's" in the SAW) whereas counter 29 has reached a count of 64 (indicating that the complete SAW has been counted). Under this condition, none of gates 34, 36, 37, 38, 40, 45 are enabled. As a result, the 4-bit sequence code word generated by the sequence generator II and the 8-bit synchronization code word from its read-only memory are forced into the available rows in TFM 39 via input selector 44 and thereafter eventually occupy the available time slots of the transmission frame.

Under "overload" conditions, counter 25 has reached a count of 24 prior to counter 29 reaching a count of 64. Accordingly, at the count of 24 decoder 35 switches to logic "" thereby disabling gate 34. As a result, no further "1's" in the SAW, which would cause gate 38 to emit a write enable (WE) pulse, are passed by gate 34 and the voice samples in TSM 19 associated with the latter "1's" (i.e., beyond the 24th) cannot be transmitted. This condition results in an amplitude error due to "overload" since the receiver will use corresponding previous samples to reconstruct the unpredictable samples which could not be transmitted.

To alleviate sample (i.e. amplitude) error due to "overload", the servicing sequence is continuously recirculated. That is, in the present example, the 6-bit sequence generator II started with a 6-bit sequence code word defining voice circuit $C_3$ and thereafter generated, in sequence, 63 6-bit code words defining voice circuits $C_4, C_5, \ldots C_{64}, C_1, C_2$. During the next frame period, the sequence generator is updated to start with a 6-bit sequence code word defining voice circuit $C_4$ and thereafter generates 63 6-bit code words defining voice circuits $C_5, D_6 \ldots C_{64}, C_2, C_3$. As a result the first bit read from multiplexer 22 is the bit corresponding to voice circuit $C_4$ followed, in sequence, by the bits corresponding to the other voice circuits. In a like manner TSM 19 is addressed by the 6-bit sequence code word from sequence generator II starting with the row storing the voice sample from voice circuit $C_4$. In this manner, recirculation of the voice circuits $C_1 - C_{64}$ occurs such that each voice circuit $C_1 - C_{64}$ effectively becomes the first voice circuit sampled every 64 frames.

Figure 8:
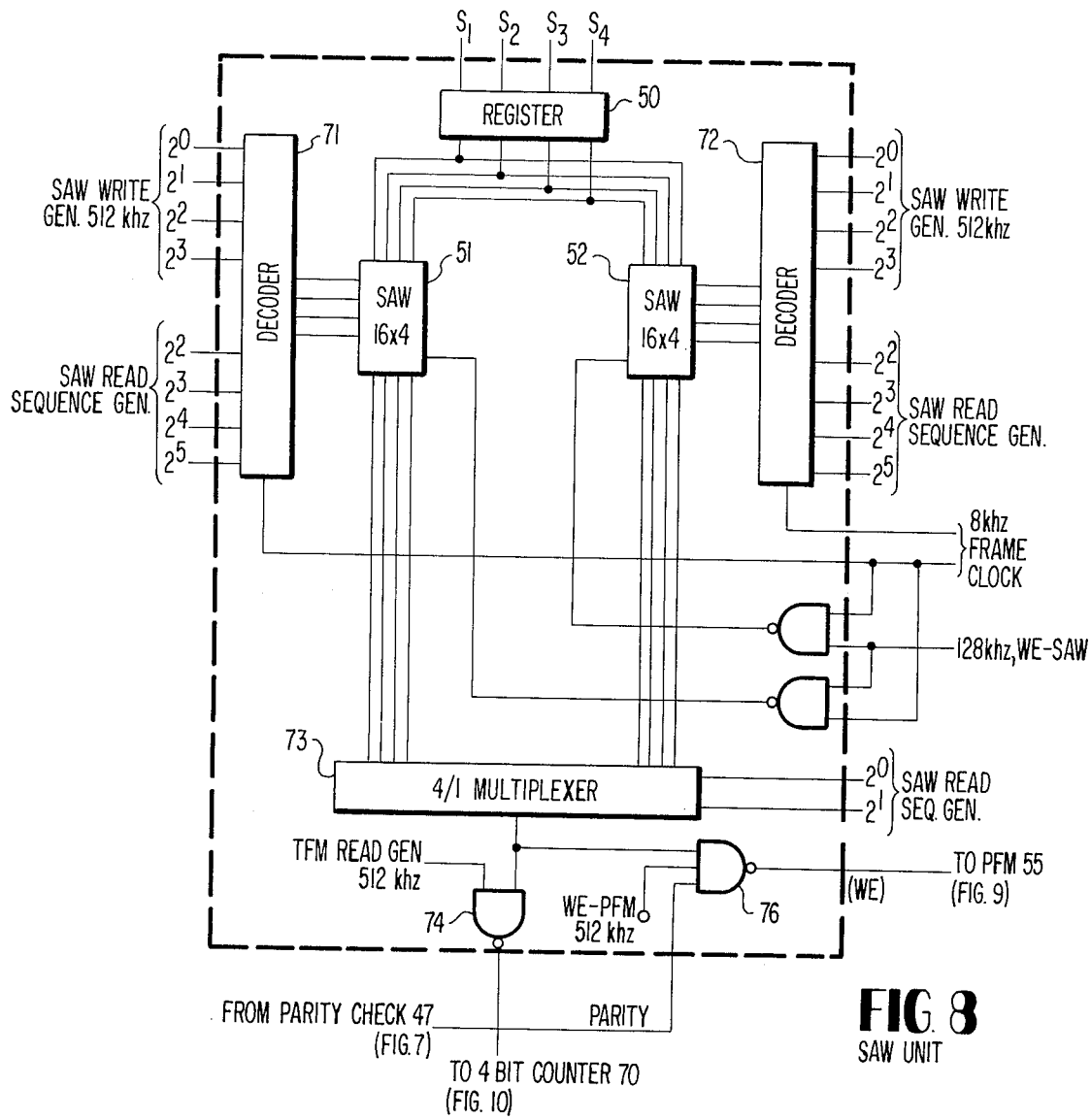
FIG. 8 is a schematic diagram of a sample assignment word (SAW) memory unit of the receiver.
Figure 11:
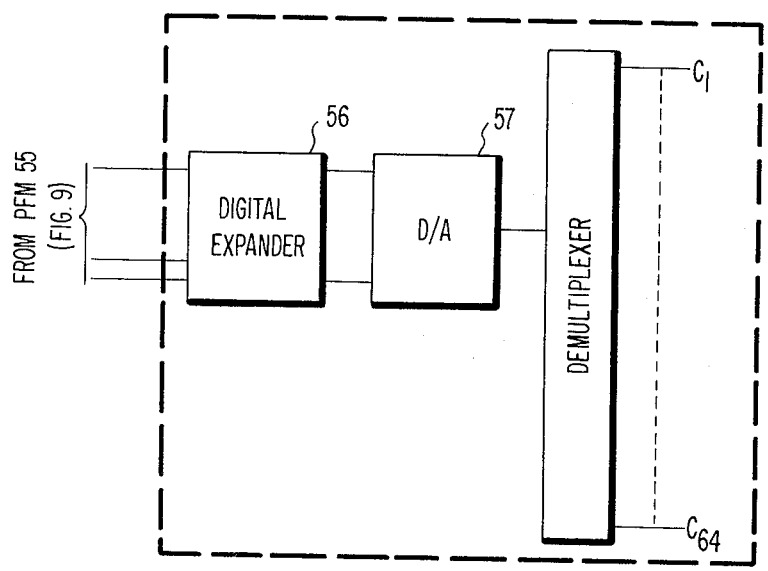
FIG. 11 is a block diagram of equipment used for the digital-to-analog conversion of the received signals.
Figure 9:
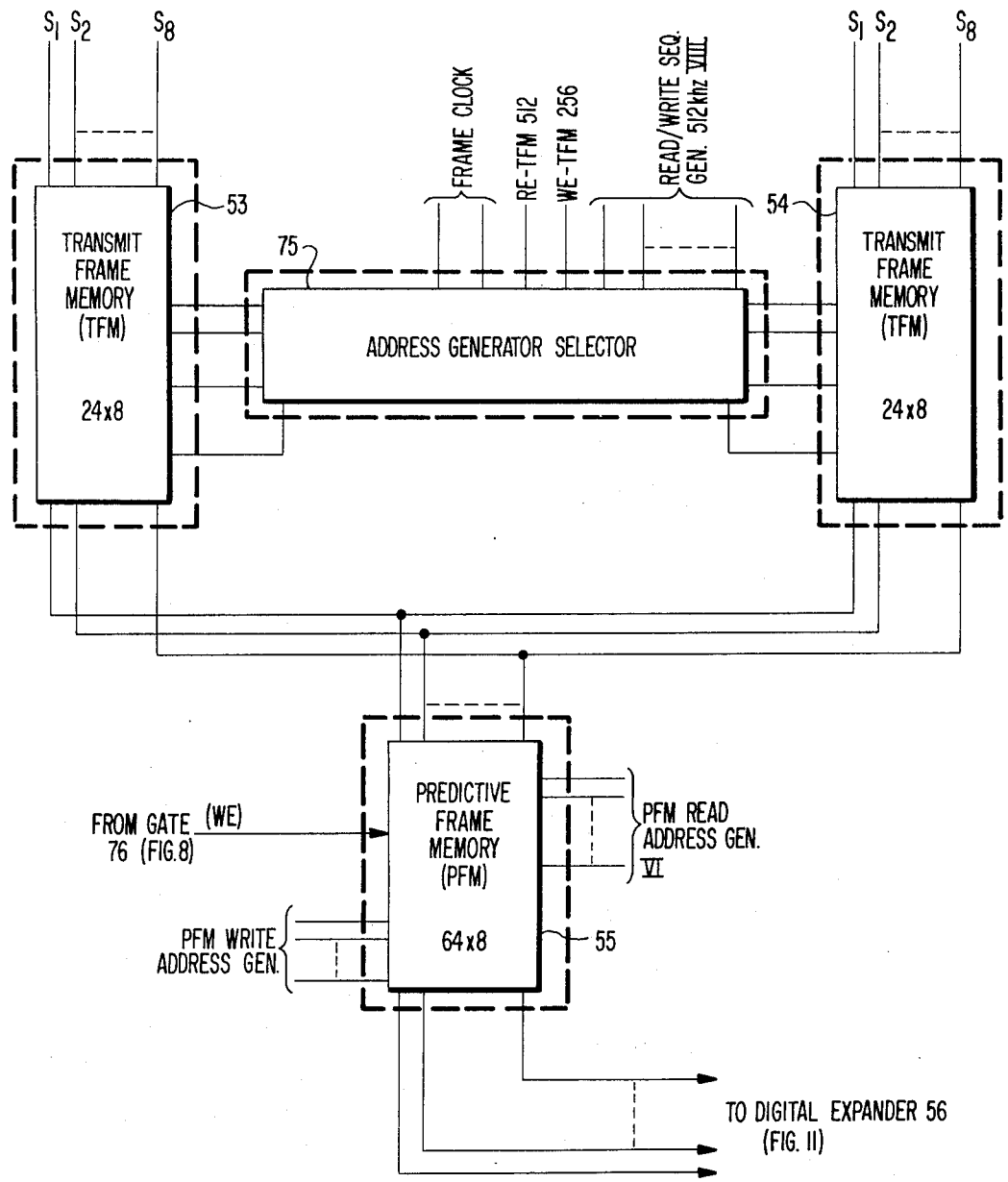
FIG. 9 is a schematic diagram of the processing unit of the receiver for processing the received digital signals.

Referring to FIG. 7 there is disclosed a schematic diagram of an input unit at the receiver which receives the frame of information transmitted. The received information comprising, in series, 64 bits of the SAW and 24 time slots $T_1 - T_{24}$ of voice information is received on input line 46. The SAW is fed to parity check apparatus 47 and 4-stage shift register 48. The SAW is shifted into shift register 48 from 4-stage shift register 49. The SAW is then fed, four bits at a time, to shift register 50. (FIG. 8) where it is then transfered, 4 bits at a time, into one of two SAW memory units 51 or 52. AS with the SAW memories 13 and 14 at the transmitter, the SAW memory units 51 and 52 operate during alternate frame periods to write and read the SAW. During one frame, for example, while memory 51 is accepting the received SAW, memory 52 is outputting the previously received SAW. The operation of these memory units is controlled by the 8 kHz frame clock and the 128 khz write enable (WE-SAW) pulses from the memory control unit (FIG. 10). After the received SAW is stored in one of the memories, for example, memory 51, the channels of information $T_1 - T_{24}$ are received and transferred to the two four-bit shift registers 38 and 49. Each received sample comprising eight bits is then shifted into one of two transmission frame memories (TFM) 53 or 54 (FIG. 9). As with the transmission sequence memories (TSM) 19 and 20 at the transmitter, the transmission frame memories 53 and 54 operate during alternate frame periods to write and read the received code words in time slots $T_1 - T_{24}$. Again, during one frame period while, for example, TFM 53 is writing-in the received samples the previously received samples are being read from memory 54.

Assuming the presently received frame of information is stored in the respective SAW memory unit 52 and TFM 54 and a parity check (described later) has indicated that the received SAW was not corrupted by an odd number of errors, the manner in which the 64 voice circuits at the receiver are up-dated will now be described. In doing so, it should be noted that though there is an effective recirculation of the servicing sequence of the voice circuits at the transmitter, the voice circuits $C_1 - C_{64}$ are always initially sampled in a set sequence starting with voice circuit $C_1$ and sequencing through voice circuit $C_{64}$. Accordingly, the de-multiplexer at the receiver must also de-multiplex the up-dated frame of information of the 64 voice circuits starting with voice circuits $C_1$ and sequencing through voice circuit $C_{64}$. It is, therefore, necessary that predictive frame memory (PFM) 55 deliver the frame of information to the digital expander 56 and eventually to the digital-to-analog converter 57 in a set sequence starting with voice circuit $C_1$ and sequencing through voice circuit $C_{64}$.

The TFM 54, which is a memory having 24 rows of 8/bits/row, receives and stores the transmitted samples $T_1 - T_{24}$ in an order wherein the lowest active voice circuit relative to the particular sequence is stored. That is, continuing with the present example, sequence number 3 of the possible 64 sequences is transmitted. The transmitter has effectively selected for possible transmission voice circuit $C_3$ as the first voice circuit. If the first five bits of the SAW are 00101 (corresponding to $C_3, C_4, C_5, C_6, C_7, \ldots$), as previously mentioned, then the sample corresponding to voice circuit $C_5$ is the first unpredictable sample and will be located in time slot $T_1$ and, when received, will be stored in the first row of TFM 54. Accordingly, voice circuit $C_5$ will be the lowest active circuit relative to the sequence number 3. Thereafter, voice circuit $C_1$ may be the 22nd active circuit relative to the sequence number 3 and would be eventually stored in row 22 of TFM 54. It would then be necessary to transfer the unpredictable sample corresponding to voice circuit $C_1$, placing that sample in the first row of PFM 55 followed in sequence by the active voice circuits in sequence number 3 subsequent to voice circuit $C_1$.

To be able to transfer the samples from TFM 54 to PFM 55 in a manner for proper reconstruction of the 64 voice circuits, it is necessary to know for any sequence number 1 – 64 where (in the particular sequence under consideration) in the SAW the bit associated with voice circuit $C_1$ is located. If the transmitter is presently operating under sequence number 3 and the receiver knew that the particular sequence being received is sequence number 3, then it knows that the first bit received in the SAW corresponds to circuitt $C_3$. The receiver can then determine that the 63rd bit in the received SAW will correspond to the voice circuit $C_1$. If the received sequence was number 21, then the 45th bit in the received SAW would correspond to voice circuit $C_1$, and so on. Accordingly, in response to a clock synchronized with the reception of the first bit of the SAW, the two four-bit counters 58 and 59 (the sequence generator of the receiver synchronized with the sequence generator of the transmitter) in the memory control unit of FIG. 10 emit a 6-bit code word representing the sequence number 3. The six-bit code word representing sequence 3 is then fed to four-bit counters 60 and 61. These four-bit counters 60 and 61 commence counting from number 3 at the SAW clock rate of 2048 khz at a time when the first bit of the SAW is being received over line 62. The output of four-bit counters 60 and 61 is then correlated in correlators 63 and 64 which are set to the number 63. When the four-bit counters 60 and 61 read 63, there is a correlation, and the receiver then knows that in the next clock period the received SAW bit will be that corresponding to voice circuit $C_1$. When the count of 63 is reached, a pulse is fed via line 65 to flip-flop 66. Flip-flop 66 then changes state inhibiting a gate 67 which has been previously enabled to pass all the bits of the received SAW starting with the first bit relating to voice circuit $C_3$ up to and including the bit relating to voice circuit $C_{64}$. While the gate 67 is passing the received sequence of SAW bits, the number of "1's" being received are counter in four-bit counters 68 and 69 which are equivalent to a 6-bit counter. When the gate 67 is disabled, the four-bit counters 68 and 69 have reached a count which indicates (assuming the count is 21) that the first 21 rows in the TFM 54 store unpredictable samples corresponding to 21 of the voice circuits from $C_3$ . . . $C_{64}$. This number 21 is then shifted into four-bit counters 70 and 71.

While the foregoing is occuring, the sequence generators (counters 58 and 59) has transferred a 4-bit code word (the 4 most significant bits of the sequence code word) to the decoder 72 (FIG. 8) and a 2-bit code word (the 2 least significant bits of the sequence code word) to multiplexer 73. As a result, the bit relating to $C_1$ will be the first bit read from the multiplexer 73 followed in sequence by the remaining 63 bits of the SAW. When the 4-bit counters 70, 71 have stored therein the number (21) of active voice circuits from $C_3 - C_{64}$, the SAW memory 52 and multiplexer 73 are enabled to emit the bit relating to voice circuit $C_1$. If this bit is, for example, a "1" then it is fed via gate 74 to the counters 70, 71 where it advances the count one number to 22. This number 22, which is fed to TFM 54 via the address generator selector 75 (similar to address generator select 21 at the transmitter), then defined row 22 in TFM 54 as the row containing the unpredictable sample corresponding to voice circuit $C_1$. The "1" from memory 52 is also fed via multiplexer 73 to predictive frame memory (PFM) 55 via gate 76 to serve as a write enable (WE) pulse. At the time the write enable (WE) pulse is received, the PFM 55 has also received a code word from the PFM read-write address generator (see FIG. 10) which defines the first row of memory 55 which always stores the sample from voice circuit $C_1$. Accordingly, in response to the write enable pulse the 22nd row of TFM 54 containing an unpredictable sample from voice circuit $C_1$ is transferred from the TFM 54 to the first row of PFM 55. Thereafter, as the SAW memory 52 emits the SAW via gates 74 and 76, each time there is a "1" the counters 70 and 71 are advanced one number thereby advancing the TFM 54 to the row associated with that "1". Each time a bit ("0" or "1") is emitted from SAW memory 52 and multiplexer 73, the PFM read-write address generator advances one number thereby defining the next row in PFM 55. Consequently, each time a "1" is emitted from SAW memory 52, the unpredictable sample in TFM 54 is properly transferred to the PFM 55 in a manner heretofore discussed wherein the unpredictable sample replaces the corresponding previous sample stored therein. In this manner, the sampling sequence is "desequenced".

AFter the frame is analyzed and all the unpredictable samples are transferred to the PFM 55, the samples from voice circuit $C_1 - C_{64}$ are sequenced out of PFM 55 and fed to digital expander 56. Digital expander 56, well-known in the art, expands each eight-bit sample to a 12-bit sample and transfers the sample to a digital-to-analog form. Thereafter, the analog samples are demultiplexed and fed to the proper receive circuits $C_1 - C_{64}$.

If there is an "underload" condition then the number of voice samples written into the TFM 54 will be less than the capacity of TFM 54. Accordingly, it will not be necessary to transfer voice samples from the TFM 54 to the PFM 55 when, the TFM read generator (counters 70, 71) has reached a number corresponding to the maximum number of samples stored therein. For example, if there were only 12 unpredictable samples in the transmitted frame, then only the first 12 rows of TFM 54 will be filled with unpredictable samples. Accordingly, in de-sequencing the samples from TFM 54 to PFM 55, when the 12th row has been reached, it would not be necessary to examine the remainder of the SAW for possible unpredictable samples. Upon reaching the highest numbered sample stored in an underload condition relative to the particular sequence, the de-sequencing operation may cease since no more samples need by de-sequenced. The receiver does this by storing in register 77, which relates to TFM 54 (register 78 relates to TFM 53), the cord word corresponding to the specific TFM write address defining the row in TFM 54 where the last sample to be transferred into TFM 54 is stored. This number is then fed to correlator 79 where it is correlated with the 5-bit code word from the two four-bit counters 70 and 71. When this latter number correlates with the code word from register 77, the receiver will know that the highest number sample relative to the sequence has been reached. In response thereto, the correlator 79 will emit a re-set pulse which will cause the 4-bit counters 70, 71 to re-set.

A synchronization code word is transmitted in the 24th channel if there is an underload condition. The SAW, as it is received on line 46, is fed to a five-bit counter 80 of FIG. 7 via gate 81 wherein the five-bit counter 80 counts the number of "1's" in the SAW. Meanwhile, the five-bit 82 via gate 83 counts the number of samples transferred into TFM 54 during that frame. If the number from counter 82 is greater than the number in counter 80 when correlated in correlator 84, then an underflow condition is indicated. This indication of an underflow from correlator 84 is used to enable gate 101 of the SPEC frame synchronzier shown in FIG. 7A. The input to the frame synchronizer is a 2.048 Mbps bit stream from the demodulator. The synchronization code word correlator 102 accepts this input along with a locally generated code word (10111000) from read only memory 103 and makes comparison between those two inputs only on the current address N. The number of bit for ibt disagreements between the 8-bit word beginning at N and the local code word 10111000 are accumulated in the error counter 104. As long as the number contained in the error counter 104 is less than ε, the frame counter 105 is incremented and the current address remains unchanged. Synchronization is achieved when the frame counter 105 reaches a count in error counter 104 is less than ε. To detect this condition, decoder 106 provides an output to gate 107 when the count in frame counter 105 equals the number n. The other input to gate 107 is probided by the output of comparator 108 which compares a number from a read-only memory corresponding to the allowable error ε with the count in error counter 104. Comparator 108 provides a "1" output as long as the count in error counter 104 is less than ε. The resulting pulse output from gate 107 is the synchronzing signal which is applied to the crystal clock in the time base generator V in FIG. 10. The synchronization pulse output from gate 107 also resets frame counter 105.

If the error counter 104 accumulates a count exceeding ε and the frame counter 105 contains a count less than n, the current address N is incremented, the two counters 104 and 105 are reset and the process of searching for the synchronizing code word begins again. The manner in which this is accomplished will now be explained. When the count in error counter 104 exceeds ε, the output of comparator 108 goes to "0" disabling gate 107. This "0" output is, however, inverted at one input of gate 109 thereby enabling that gate to pass the next 8 khz clock pulse. The output of gate 109 is connected to the reset. The output of gate 109 is also connected to the trigger input of counter flip-flop 111 and to one input of each of gates 112 and 113. The other inputs of each of gates 112 and 113 are respectively connected to the opposite outputs of flip-flop 111. The output of gate 112 is connected to the increment input of positive address counter 114, while the output of gate 113 is connected to the increment input of negative address counter 115. The parallel outputs of counters 114 and 115 are multiplexed by a plurality of gates represented symbolically by gates 116 and 117, respectively, and read into address register 118. Gates 116 and 117 are controlled by the opposite phase outputs of flip-flop 111 in such a manner that the contents of one of counters 114 or 115 are being transferred to register 118 while the other is being incremented. Current address counter 119 is driven by the 2.048 Mhz clock from time base generator V (FIG. 10). The contents of counter 119 is the current address N, and this is compared with the contents of address register 118 by comparator 121. The output of comparator 121 is the second input to gate 101 thus enabling the synchronization code word correlator 102 when the next underflow condition is detected. When synchronization is re-established, counters 114 and 115 are reset by the synchronization pulse output from gate 107.

The structure just described generates a synchronization address search pattern given by 0, +1, −1, +2, −2, +3, −35 . . . , +256, −256. This pattern has a particular advantage when synchronization is lost, since the new synchronization address is most likely to bery close to the old synchronization address.

Figure 7B:
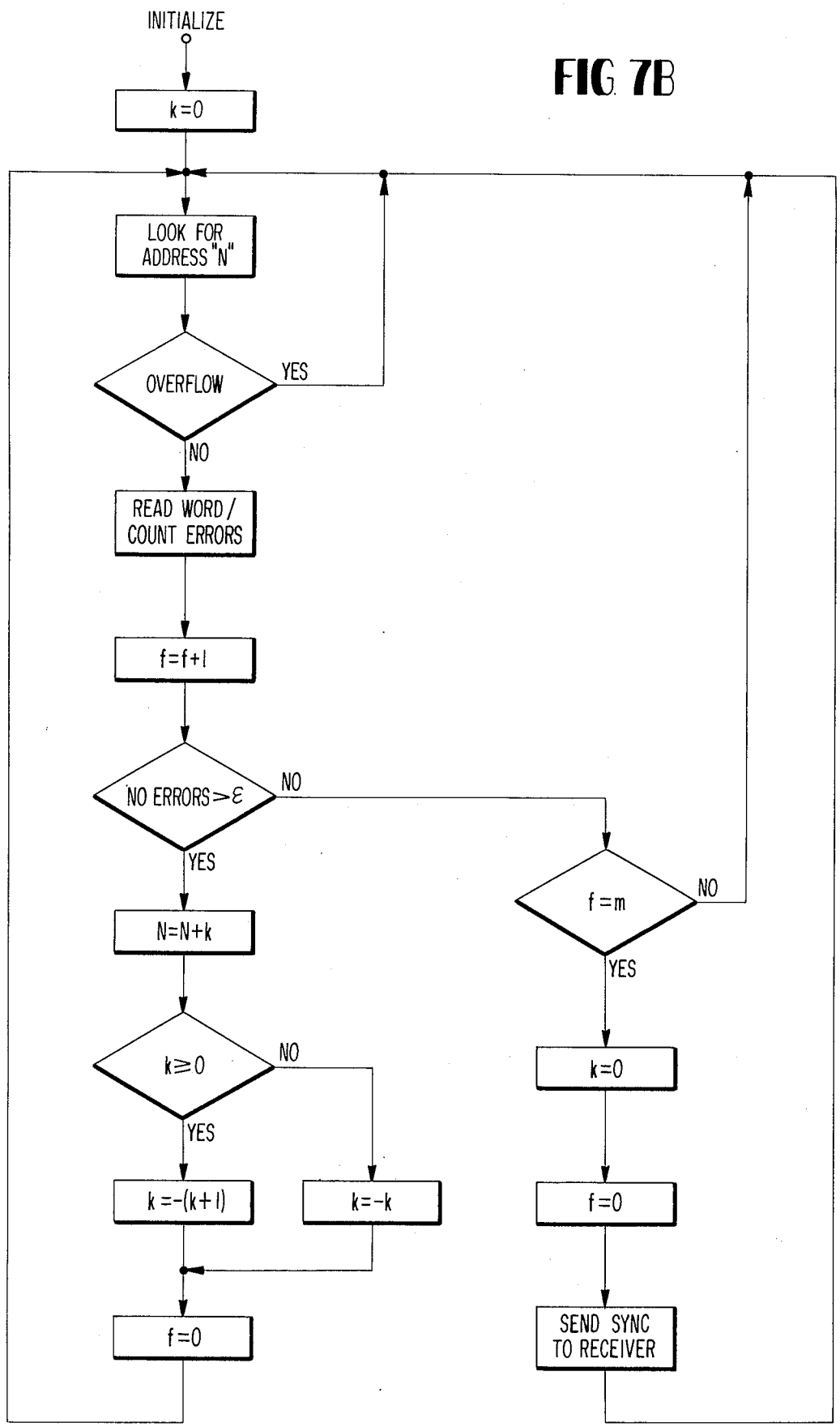
FIG. 7B is a flow diagram illustrating the frame synchronization operation.

FIG. 7B summarizes, in flow chart form, the operation of the frame synchronizer shown in FIG. 7A. Thus, initially counters 114 and 115 are set to $k = 0$, and current address counter 119 looks for address "N". If there is an overflow, the synchronization cycle is inhibited; otherwise, the SPEC frame word is read, frame counter 105 is incremented to $f = f = 1$ and errors counted in counter 104 when N equals the contents of address register 118. If the number of errors counted is less than the allowable errors ε but the contents of counter 105 does not equal n, then the synchronization cycle is inhibited. If the number of errors is less than ε and $f = n$, then a synchronization pulse is generated by gate 107 which not only synchronizes the time base generator but also resets counters 114 and 115 ($k = 0$) and counter 105 ($f = 0$). On the other hand, when the number of errors exceeds ε, counters 114 and 115 are alternately incremented in the synchronization search routine.

Also noted in the discussion of the transmitter in an underload condition was the transmission of the actual 6-bit sequence code word (plus 2 parity bits) defining the particular servicing sequence in one of the unused channels, the 23rd channel in the preferred embodiment. The purpose of this was to verify to the receiver the particular sequence being transmitted in the event that the sequence generator of the receiver might not be in synchronization with the sequence generator of the transmitter. If the number from counter 82 in FIG. 7 is greater than by at least two, the number in counter 80 when correlated in correlator 84, then an underflow condition sufficient to include the sequence code word is indicated. In response to this condition, the sequence code word, which has been transmitted in a manner similar to the parity check made on the received SAW (later described) in the 23rd time slot is first checked for parity and then fed to register 85, controlled by gate 87, and then transferred to register 86, controlled by gate 88, during the output of gate 88 enabling gate 90 which causes the transmitted sequence code word to be jammed into counters 91 and 92 of the sequence generator for use as the receiver generated sequence code word. In this manner, the receiver is insured that it is de-sequencing the particular frame under the right sequence.

A parity check is made at the input unit of the receiver to determine if an even number of "1" bits in the SAW is being received. If the parity check indicates there is an even number of "1 's," then the receiver is allowed to process the received unpredictable samples associated with that SAW to enable reconstruction of the voice samples in the frame. However, if the parity check indicates that an odd number of "1 's" in the SAW has been received (due, for example, to the corruption of one of the bits in the SAW by channel noise) then the receiver is not allowed to process the unpredictable samples since the channel routing information provided by the SAW is incorrect. Instead, the reciver reconstructs the samples already stored in PFM 55 without updating those samples with the received unpredictable samples. This will result in an amplitude error, however, this error will be slight since the samples which should have been updated will be close in value to their corresponding unpredictable samples.

To make a parity check as the SAW is being received, each time a "1" appears gate 93 is enabled via an enabling level from 4-bit counters 94, 95 and gate 96. Each time gate 93 is enabled, the flip-flop 97 changes state. If after the entire SAW is received flip-flop 97 is in the state indicating a parity check, then an enabling level via gate 98 is fed to one of two flip-flops 99, 100 (there being one flip-flop associated with TFM 53 and one associated with TFM 54) which outputs an enabling level to gate 76 thereby enabling the substitution of unpredictable samples in PFM 55. If a parity check is not indicated, then gate 76 does not receive an enabling level and the unpredictable samples transmitted with the SAW are not processed.

As described herein, the SPEC system employs recirculation of the service priorities each frame in order to uniformly distribute the amplitude error due to overload. This is accomplished by sequencing the sample assignment priorities at the transmitter and "desequencing" the sample assignment at the receiver. The transmitter updates the starting circuit number in the sequence by one count every frame. The receiver makes use of this fact by also updating its starting circuit number by one count every frame.

The particular feature of the SPEC system which constitutes the present invention is a frame synchronization technique that requires no increase in transmitted bit rate by transmitting synchronization information in an unused time slot only during period of underflow. Worst case initial synchronization acquisition time is approximately 0.5 seconds. Reacquisition time following synchronization loss averages 3–4 minutes. At a bit error rate of $10^{-4}$, the time between synchronization misses is about $10^4$ years and the time between false detections is approximately $10^{20}$ years.

It will be apparent, however, that the embodiment shown is only exemplary and that various modifications can be made in constructions and arrangement within the scope of the invention as defined in the appended claims.

What is claimed is:

1. In a digital communications system wherein information from a plurality of voice circuits at a transmitting station may be transmitted at a minimum bit rate to a receiving station via a transmission path by transmitting information from a predetermined number less than said plurality of voice circuits over the transmission path during any given frame, said system periodically sampling the amplitude of voice signals on each circuit of said plurality of voice circuits, comparing for each of said circuits a present amplitude sample with a prior amplitude sample which had been transmitted to the receiving station, and generating a transmission frame comprising a digital representation of those amplitude samples which differ from the corresponding prior amplitude samples by a predetermined amount, said transmission frame exhibiting an underflow when less than said predetermined number of samples are transmitted, a method of frame synchronization including the step of transmitting frame synchronization information in an unused time slot only during periods of underflow.

2. In a digital communications system as recited in Claim 1, said system receiving the digitally encoded transmission frame over the transmission path, storing previously transmitted digitally encoded samples from prior sampling frames, and substituting for the samples stored respective transmitted present samples, said method of frame synchronization further including the steps of detecting an underflow condition in the received transmission frame, looking for the frame synchronization information in an unused time slot, and generating a synchronization pulse when the frame synchronization information is detected.

3. In a digital communications system wherein information from a plurality of voice circuits at a transmitting station may be transmitted at a minimum bit rate to a receiving station via a transmission path by transmitting information from a predetermined number less than said plurality of voice circuits over the transmission path during any given frame, said system including meanms for periodically sampling the amplitude of voice signals on each circuit, means for comparing for each of said circuits a present amplitude sample with a prior amplitude sample which had been transmitted to the receiving station, and means for generating a transmission frame comprising a digital representation of those amplitude samples which differ from the corresponding prior amplitude samples by a predetermined amount, said transmission frame exhibiting an underflow when less than said predetermined number of samples are transmitted, the improvement comprising means at the transmitting station for detecting an underflow condition and means responsive to said underflow detecting means for controlling said transmission generating means to include frame synchronization information in an unused time slot during periods of underflow.

4. In a digital communications system as recited in claim 3, said system further including means at said receiving station for receiving the digitally encoded transmission frame over the transmission path, means for storing previously transmitted digitally encoded samples from prior sampling frames, and means for substituting for the samples stored respective transmitted present samples, the improvement further comprising means at said receiving station for detecting an underflow condition in a received transmission frame and means responsive to said receiving underflow detecting means for detecting frame synchronization information in an unused time slot of the received transmission frame and generating a synchronization pulse when the frame synchronization information is detected.

5. In a digital communications system wherein information from a plurality of voice circuits at a transmitting station may be transmitted at a minimum bit rate to a receiving station via a transmission path by transmitting information from a perdetermined number less than said plurality of voice circuits over the transmission path during any given frame, said system periodically sampling the amplitude of voice signals on each circuit of said plurality of voice circuits comparing for each of said circuits a present amplitude sample with a prior amplitude sample which had been transmitted to the receiving station, and generating a transmission frame comprising a digital representation of those amplitude samples which differ from the corresponding prior amplitude samples by a predetermined amount, said transmission frame exhibiting an underflow when less than said predetermined number of samples are transmitted, receiving the digitally encoded transmission frame over the transmission path, storing previously transmitted digitally encoded samples from prior sampling frames, and substituting for the samples stored respective transmitted present samples, a method of frame synchronization including the steps of
  transmitting frame synchronization information in an
    unused time slot only during periods of underflow,
  detecting an underflow condition in the received
    transmission frame, iteratively searching for the
    frame synchronization information in the received
    transmission frame, alternately changing the direction of the search for the frame synchronization
    information with each iteration and generating a
    synchronization pulse when the frame synchronization information is detected.

6. In a digital communications system wherein information from a plurality of voice circuits at a transmitting station may be transmitted at a minimum bit rate to a receiving station via a transmission path by transmitting information from a predetermined number less than said plurality of voice circuits over the transmission path during any given frame, said system including means for periodically sampling the amplitude of voice signals on each circuit, means for comparing for each of said circuits a present amplitude sample with a prior amplitude sample which had been transmitted to the receiving station, and means for generating a transmission frame comprising a digital representation of those amplitude samples which differ from the corresponding prior amplitude samples by a predetermined amount, said transmission frame exhibiting an underflow when less than said predetermined number of samples are transmitted, means at said receiving station for receiving the digitally encoded transmission frame over the transmission path, means for storing previously transmitted digitally encoded samples from prior sampling frames and means for substituting for the samples stored respective transmitted present samples, the improvement comprising,
    means at the transmitting station for detecting an underflow condition,
    means responsive to said underflow detecting means for controlling said transmission generating means to include frame synchronization information in an unused time slot during periods of underflow,
    means at said receiving station for detecting an underflow condition in a received transmission frame,
    iterative means at said receiving station for iteratively searching for the frame synchronization information in the received transmission frame,
    means controlling said iterative means for alternately changing the direction of the search in the received transmission frame for the frame synchronizatiion information with each iteration, and
    means for detecting frame synchronization information in an unused time slot of the received transmission frame and generating a synchronization pulse when the frame synchronization information is detected.

7. In a digital communications system as recited in claim 6 wherein said iterative means comprises a first counter counting at a rate equal to the bit rate in the received transmission frame, address counter means, means for comparing the outputs of said first counter and said address counter means and providing an enabling input to said frame synchronization detecting means when a comparison is found to exist, and means for incrementing said address counter means until a synchronization pulse is generated.

8. In a digital communications system as recited in claim 7 wherein said address counter means comprises an address register having outputs connected to said comparing means, second counter for counting in a positive direction, third counter for counting in a negative direction, said means for alternately changing the direction of search controlling said incrementing means to alternately increment said second and third counters and further being operative to alternately read the contents of said second and third counters into said address register.

9. In a digital communications system as recited in claim 6 wherein receiving frame synchronization detecting means comprises correlation means for comparing the digital information in a predetermined unused time slot in the received transmission frame with a unique code word identifying the frame synchronism information and counting the errors representing a failure of corresponding bits in the digital information and the code word to match, means for comparing the errors counted with a predetermined number representing allowable errors and controlling the generation of said synchronization pulse.

10. In a digital communications system as recited in claim 9 wherein said iterative means includes pulse generating means enabled by said error comparing means when the number of counted errors exceeds said predetermined number of allowable errors.

* * * * *

UNITED STATES PATENT AND TRADEMARK OFFICE
CERTIFICATE OF CORRECTION

PATENT NO. : 3,988,674
DATED : October 26, 1976
INVENTOR(S) : Joseph Albert SCIULLI It is certified that error appears in the above–identified patent and that said Letters Patent are hereby corrected as shown below:

IN THE SPECIFICATION:

Column 2, line 58 - delete "O" (letter) insert -- 0 -- (numeral)

Column 3, line 12 - delete "O" (letter) insert -- 0 -- (numeral)

line 16 - delete "O" (letter) insert -- 0 -- (numeral)

Column 4, line 49 - delete "¢is" and insert -- ¢ is --

Column 5, line 55 - delete "O" (letter) insert -- 0 -- (numeral)

Column 6, line 13 - delete "(24 = 8 time" insert -- (24 + 8 time --

Column 7, line 67 - delete " "O"'s" and insert -- "0's" --

Column 8, line 20 - delete "C1-C64" and insert -- $C_1 - C_{64}$ --

Column 9, line 25 - delete "canges" and insert -- changes -- line 29 - delete "ot" and insert -- to -- line 35 - after "5" insert -- bit -- line 40 - delete " "'[s" " and insert -- "1's" -- line 42 - delete " "1"and" and insert -- "1" and -- line 44 - delete " "1"bit" and insert -- "1" bit --

UNITED STATES PATENT AND TRADEMARK OFFICE
CERTIFICATE OF CORRECTION

PATENT NO. : 3,988,674
DATED : October 26, 1976
INVENTOR(S) : Joseph Albert SCIULLI It is certified that error appears in the above-identified patent and that said Letters Patent are hereby corrected as shown below:

IN THE SPECIFICATION (Cont'd)

Column 9, line 48 - delete " "1"bit" and insert -- "1" bit -- (both occurrences)

line 51 - delete " "1"bit" and insert -- "1" bit -- line 56 - delete "TSM 29" and insert -- TSM 19 --

Column 10, line 31 - after "enabling" insert -- of -- line 36 - after "with: insert -- a -- line 52 - delete "bit" and insert -- bits --

Column 11, line 4 - delete "4-bit" and insert -- 6-bit -- line 13 - between " " insert 0 (numeral)

line 32 - delete "$D_6$" and insert -- $C_6$ -- line 32 - after "$C_{64}$," insert -- $C_1$, -- line 52 - after "50" delete the period line 54 - delete "AS" and insert -- As --

Column 12, line 62 - delete "circuitt" and insert -- circuit --

Column 13, line 24 - delete "counter" and insert -- counted --

UNITED STATES PATENT AND TRADEMARK OFFICE
CERTIFICATE OF CORRECTION

PATENT NO. : 3,988,674
DATED : October 26, 1976
INVENTOR(S) : Joseph Albert SCIULLI It is certified that error appears in the above-identified patent and that said Letters Patent are hereby corrected as shown below:

ON THE SPECIFICATION (Cont'd)

Column 14, line 8 - delete "AFter" and insert -- After -- line 33 - delete "by" and insert -- be -- line 35 - delete "cord" and insert -- code -- line 50 - after "wherein" delete "the"

line 65 - delete "ibt" and insert -- bit --

Column 15, line 4 - after "count" insert -- of n and the count -- line 8 - delete "probided" and insert -- provided -- line 29 - after "reset" and before the period insert -- inputs of counters 104 and 105 causing these counters to be reset -- line 33 - after "opposite" insert -- phase -- line 57 - delete "-35" and insert -- -3, -- line 59 - delete "bery" and insert -- be very -- line 67 - delete "f=f=1" and insert -- f=f+1 --

Column 16, line 31 - after "gate 88," insert -- during the next clock period. -- line 31 - delete "during" and insert -- During the next clock period, flip-flop 89 is set by --

UNITED STATES PATENT AND TRADEMARK OFFICE
CERTIFICATE OF CORRECTION

PATENT NO. : 3,988,674
DATED : October 26, 1976
INVENTOR(S) : Joseph Albert SCIULLI It is certified that error appears in the above-identified patent and that said Letters Patent are hereby corrected as shown below:

IN THE CLAIMS:

Column 18, line 44 - after "circuits" insert a comma

Column 20, line 26 - delete "synchronization" and insert -- synchronism --

Signed and Sealed this

Eighth Day of March 1977

[SEAL]

Attest:

RUTH C. MASON
Attesting Officer

C. MARSHALL DANN
Commissioner of Patents and Trademarks